United States Patent
Goldsworthy et al.

(10) Patent No.: US 7,015,395 B2
(45) Date of Patent: Mar. 21, 2006

(54) COMPOSITE REINFORCED ELECTRICAL TRANSMISSION CONDUCTOR

(75) Inventors: William Brandt Goldsworthy, Torrance, CA (US); George Korzeniowski, Torrance, CA (US)

(73) Assignee: Gift Technologies, LP, Redondo Beach, CA (US)

( * ) Notice: Subject to any disclaimer, the term of this patent is extended or adjusted under 35 U.S.C. 154(b) by 0 days.

(21) Appl. No.: 10/037,814

(22) Filed: Dec. 28, 2001

(65) Prior Publication Data

US 2004/0026112 A1   Feb. 12, 2004

Related U.S. Application Data

(63) Continuation of application No. 09/500,285, filed on Feb. 8, 2000, now abandoned.

(51) Int. Cl.
*H01B 7/18*   (2006.01)

(52) U.S. Cl. .............................. 174/102 R; 174/113 C
(58) Field of Classification Search ............ 174/102 R, 174/106 R, 70 R, 113 C; 385/101, 102, 385/103, 104, 107, 111, 113

See application file for complete search history.

(56) References Cited

U.S. PATENT DOCUMENTS

| | | | | | |
|---|---|---|---|---|---|
| 3,324,233 | A | * | 6/1967 | Bryant | 174/131 R |
| 4,422,718 | A | * | 12/1983 | Nakagome et al. | 385/113 |
| 4,441,787 | A | * | 4/1984 | Lichtenberger | 385/107 |
| 4,449,012 | A | * | 5/1984 | Voser | 174/70 A |
| RE32,374 | E | * | 3/1987 | Dey et al. | 385/113 |
| 4,690,497 | A | * | 9/1987 | Occhini et al. | 385/107 |
| 4,770,489 | A | * | 9/1988 | Saito et al. | 385/113 |
| 4,793,685 | A | * | 12/1988 | Taylor et al. | 385/113 |
| 4,966,434 | A | * | 10/1990 | Yonechi et al. | 385/103 |
| 5,082,379 | A | * | 1/1992 | Lindner et al. | 385/101 |
| 5,222,173 | A | * | 6/1993 | Bausch | 385/101 |
| 5,808,239 | A | * | 9/1998 | Olsson | 174/113 C |

* cited by examiner

*Primary Examiner*—Chau N. Nguyen
(74) *Attorney, Agent, or Firm*—Christie, Parker & Hale, LLP

(57) ABSTRACT

A composite reinforced electrical transmission conductor primarily designed for transmission of electrical signals. The conductor is comprised of a reinforced plastic composite inner core along with an outer highly electrically conductive sheath therearound. In this way, the inner core provides the necessary strength and the outer sheath provides for transmission of the electrical signals. In a preferred embodiment, the reinforced composite core is comprised of individual sections which cooperate together to provide the necessary loading capabilities. Further, a fiber optic cable may also be carried by the composite reinforced core. A splicing arrangement for securing ends of the cable together is also provided.

18 Claims, 4 Drawing Sheets

COMPOSITE REINFORCED ELECTRICAL TRANSMISSION CONDUCTOR

CROSS-REFERENCE TO RELATED APPLICATION

This application is a continuation of U.S. application Ser. No. 09/500,285, filed on Feb. 8, 2000, now abandoned, the contents of which are fully incorporated herein by reference.

BACKGROUND OF THE INVENTION

1. Field of the Invention

This invention relates in general to certain new and useful improvements in electrical transmission cables and, more particularly, to electrical transmission cables which have a composite reinforced component to provide loading capabilities.

2. Brief Description of the Related Art

In electrical conductors and, particularly, long distance electrical conductors, copper was frequently employed because of its superior conductive properties and was widely used until about the time of World War II, at which point its primary use was directed to war efforts. Prior to that time, and even thereafter, conductor technology and the selection and mixture of different wire materials has evolved gradually since the end of the Nineteenth Century. However, after World War II, aluminum was widely used in place of copper conductors and was soon integrated with a steel core in electrical transmission cables for greater strength. Today, the aluminum conductor, which is steel reinforced (referred to as "ACSR"), remains as an industry standard.

The evolution of conductors continued with the introduction of a compacted overhead conductor which provided greater conductivity with the same diameter as the aluminum conductor steel reinforced cable. However, in about 1985, the aluminum conductor which was steel supported, frequently referred to as "ACSS", was introduced by Reynolds Cable and has gained wide commercial acceptance in the past few years. The ACSS cable is designed for high voltage transmission with less sag. However, the compacted overhead conductor and the ACSS cable are priced about ten percent higher than the ACSR.

The evolution of conductor technology has moved to the exploratory use of composite cores, such as carbon, ceramics and fiberglass, with the advent of research leading to the present invention. These materials offer unprecedented technical performance advantages over the earlier conductive materials. However, higher material costs and limited production has resulted in prices of up to ten times that of the ACSR conductor. Thus, the major challenge associated with these promising composite conductors is to become price competitive. It is desirable to provide a composite reinforced aluminum conductor for replacement of the heavy steel strength member of the ACSR with a high strength and lower weight glass-fiber composite material. The current carrying component is still pure aluminum. The main difference between the ACSR and the composite reinforced aluminum conductor ("CRAC") is that the CRAC will have a higher percentage by volume of a conductive component. This improvement is actually made possible by the much greater tensile strength of the glass relative to the steel and this frees up space in the conductor's volume for more aluminum. This further significantly increases conductor current carrying capacity along with significantly lower weight.

It can be seen from the above that some of the specific advantages of the CRAC is that:

1. The cost of the composite reinforced conductor is equal or less than the cost of the traditional steel cable conductor of the same diameter.
2. The composite materials used as the center core have a coefficient of thermal expansion which is fifty percent less than the steel core reinforcement.
3. The tensile strength (breaking strength) is about one hundred fifty percent higher than carbon steel core wire (with HC steel being approximately 210 ksi).
4. Conductivity of composite reinforced conductors is at least forty percent higher and having a target value of as much as two hundred percent higher than ACSR conductors of the same outer diameter.
5. The CRAC conductors are also capable of utilizing T&D accessories and other accessories which are installed in a similar manner in traditional cable.
6. The CRAC cables have the capability of being used with field installation equipment and procedures which exist with minimum modifications.
7. The composite materials are compatible with conventional wire and cable process technology.
8. The CRAC cables eliminate eddy-current heating.
9. A solid aluminum core has $\frac{1}{100}$ degree of radial temperature differences as compared to stranded wire.
10. There is no loss of strength in a CRAC and consequent increase in sag due to annealing of the tension member.
11. The CRAC has simplified manufacturing requirements because there is no need for multiple layers of stranded aluminum in order to cancel out self-inductance.
12. There is an elimination of non-uniform current flow due to self-inductance when using the CRAC.

In addition to the other advantages, the new CRAC conductor of the present invention has at least twice the recycling effectiveness as does the ACSR. The existence of this new CRAC along with commercial manufacturing processes allows for wire extrusion stranding and composite pultrusion processes to be used in combination in a continuous high speed, low cost, mass production assembly line. The process also converts aluminum into a high value added product by producing and integrating a lightweight composite material strength member and an optical fiber for data transmission and intelligence monitoring.

OBJECTS OF THE INVENTION

It is, therefore, one of the primary objects of the present invention to provide an electrical transmission cable which utilizes a reinforced plastic composite core as a load bearing element in the cable.

It is another object of the present invention to provide an electrical transmission cable of the type stated which employs a fiber reinforced plastic composite inner central core and an outer highly conductive layer for carrying electrical current.

It is a further object of the present invention to provide an electrical transmission cable of the type stated in which the reinforced composite inner core can be provided in individual sections which cooperate with one another to operate as a solid core, but which yet permit the winding of the cable about a transportation drum.

It is also an object of the present invention to provide an electrical transmission cable of the type stated in which the ends of the cable can easily be spliced together at an on-site location and with much less labor intensity than the splicing of a steel core cable and at significantly less cost.

It is another salient object of the present invention to provide a method of carrying electrical current through an electrical transmission cable which utilizes an inner reinforced plastic composite core.

It is still another salient object of the present invention to provide a method of making an electrical current carrying cable of the type stated which has an inner reinforced plastic composite core and which also enables the incorporation of a fiber optic cable therein during the fabrication thereof.

With the above and other objects in view, our invention resides in the novel features of form, construction, arrangement and combination of parts and components presently described and pointed in the claims.

BRIEF SUMMARY OF THE INVENTION

The present invention relates in general to electrical current carrying conductors which utilize an inner load bearing core formed of a reinforced plastic composite material in place of the conventional steel core. Heretofore, there have been numerous problems arising out of the use of the steel core, as identified above, although there has been no successful current carrying conductor which utilizes a reinforced plastic composite inner core.

The current carrying cable of the present invention in outer appearance is very similar to the conventional electrical current carrying cable having the inner steel core. In addition, and in one of the important aspects of the invention, the cable of the present invention can be used in precisely those locations in which conventional cables are presently used and they can be mounted in precisely the same manner. Thus, substitution of a cable of the type provided in accordance with the present invention can be accomplished easily and at low cost and, more importantly, with existing cable laying equipment.

The current carrying conductor of the present invention includes the reinforced plastic composite core, as aforesaid. Preferably, this core is formed of individual segments which are fitted together to operate as a single composite fiber reinforced core. The individual segments are somewhat trapezoidal shaped with the outer surfaces thereof being arcuate. In this way, the trapezoidal shaped pieces as, for example, six individual pieces or segments of the core, are arranged in a cylindrical format so that the core actually is cylindrical when assembled.

In a preferred embodiment, the individual segments of the composite reinforced core may be formed with flat inner ends to provide a center clearance hole for receiving a fiber optic cable. This can be accomplished without otherwise substantially sacrificing the load carrying capability of the cable.

The inner core is formed of a plurality of fibers or strands of reinforcing material, such as fiberglass, boron, carbon or the like, and which are held together by a binding agent, such as a thermoplastic or thermosetting resin. Any conventional thermosetting material, such as numerous conventional epoxides, or otherwise any thermoplastic material, such a polypropylene, could be used for this purpose. Thermoplastic material is preferred due to the fact that it can be easily heated and bonded on a job site and also the heating and bonding occurs much more quickly with a thermoplastic material than with a thermosetting material.

It has also been found in connection with the present invention that it is possible to literally use a smelted aluminum for higher current carrying conductivity capabilities. Thus, and contrary to standard practice, the aluminum outer sheath does not necessarily carry any one or more ingredients therein to provide strength while reducing conductivity.

The aluminum outer layer may be in the form of individual aluminum wires which are wrapped about the composite reinforced core. These outer layers may be wrapped at a shallow angle as, for example, about five to fifteen degrees with respect to the axial center line of the core. Generally, the aluminum outer wires are wrapped in a helical pattern.

The present invention also provides a proposed method and system for splicing the ends of the individual cables. As indicated previously, the cables can only be carried to a job site in finite lengths. Consequently, the splicing of cable lengths is necessary for long distance transmission. In accordance with the present invention, the outer aluminum wires are unwound from the inner composite reinforced core and bent rearwardly. Thereafter, the individual sections of the core are cut at staggered lengths relative to one another. In this way, each of the individual staggered lengths of the two ends of conductors which are to be spliced can be heat sealed together. Thus, the longest length of fiber section of one conductor is secured to the shortest length of core section of the opposite conductor. Inasmuch as the conductors are preferably formed of a polypropylene or other thermoplastic material, they can be easily reheated and allowed to cool right at a job site and where the ends become bonded to one another. This procedure takes place with each of the individual segments or sections of the inner core. Thereafter, the aluminum outer wires are spliced together by conventional techniques as, for example, by locating an aluminum sheath over the outer wires and crimping the same to each of the spaced apart outer wires.

The actual splicing operation can be conducted more quickly and with less labor intensity then when attempting to splice steel core conductors together. In addition, and since the inner core is formed of a reinforced composite material, the spliced section has essentially the same strength as any other portion of the entire conductor.

This invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention. However, it is to be understood that the following detailed description and the accompanying drawings are not to be taken in a limiting sense.

BRIEF DESCRIPTION OF THE DRAWINGS

Figure 1:
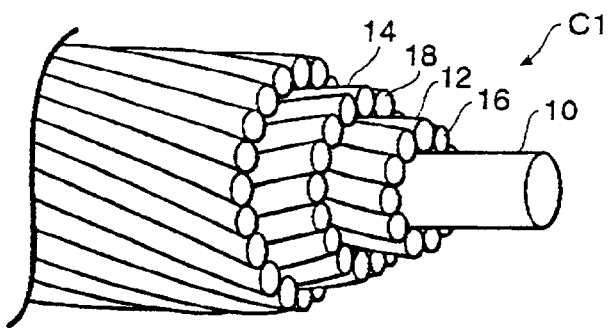
Figure 2:
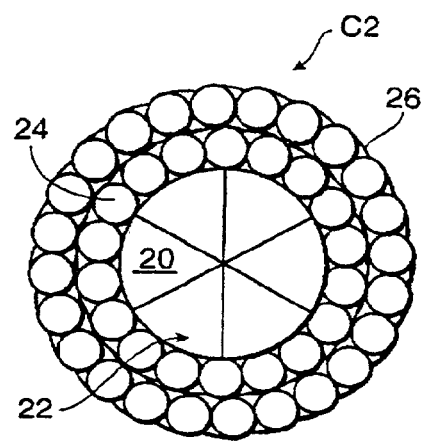
Figure 3:
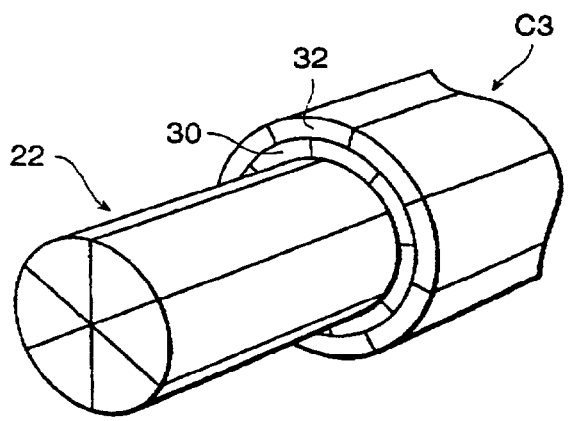
Figure 4:
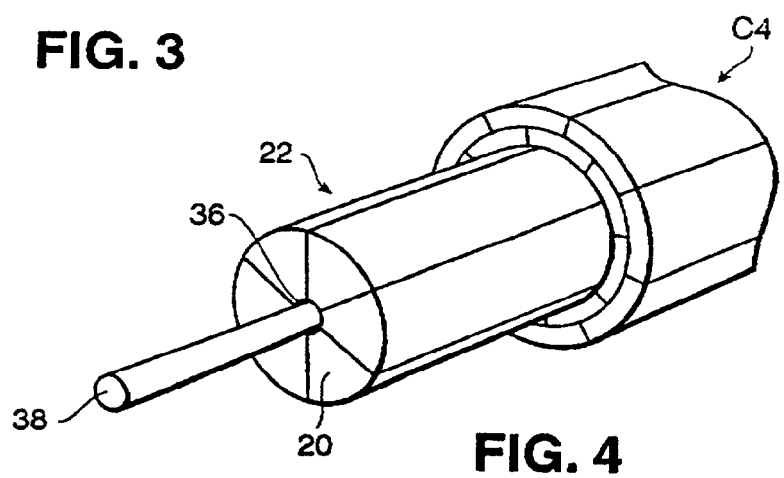
Figure 5:
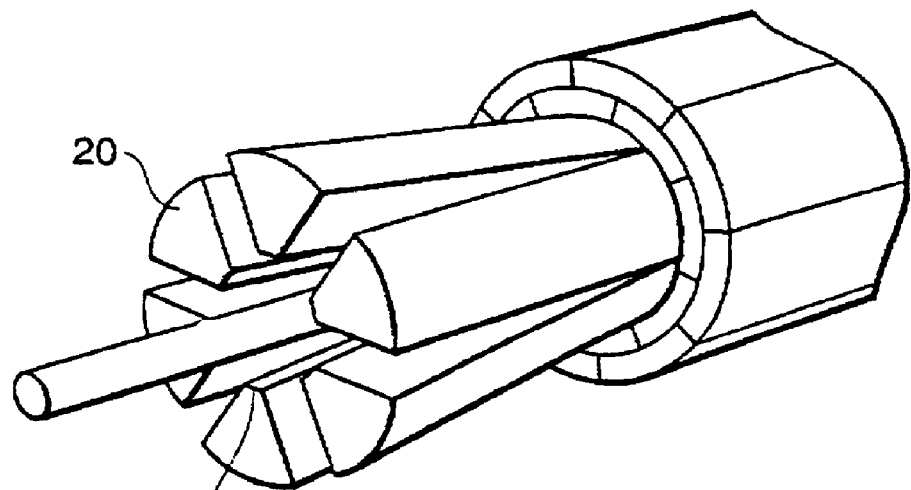
Figure 6:
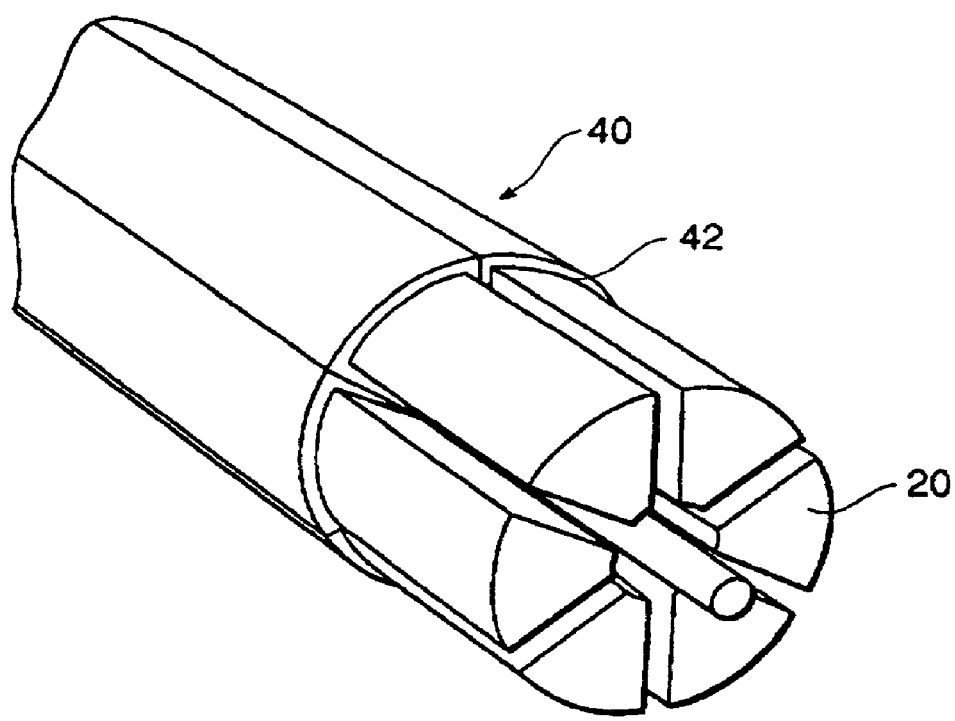
Figure 7:
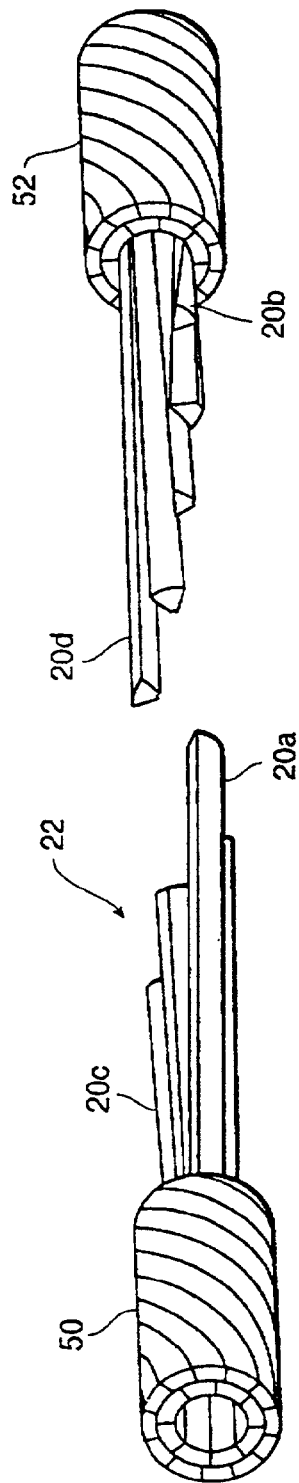
Figure 8:
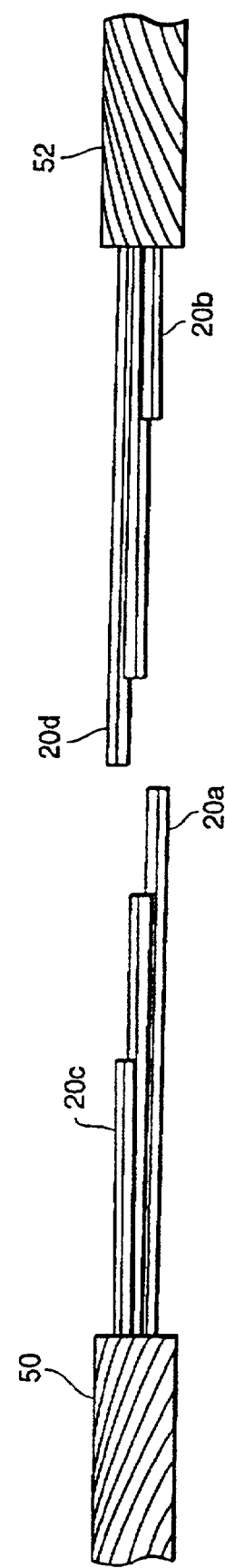
Figure 9A:
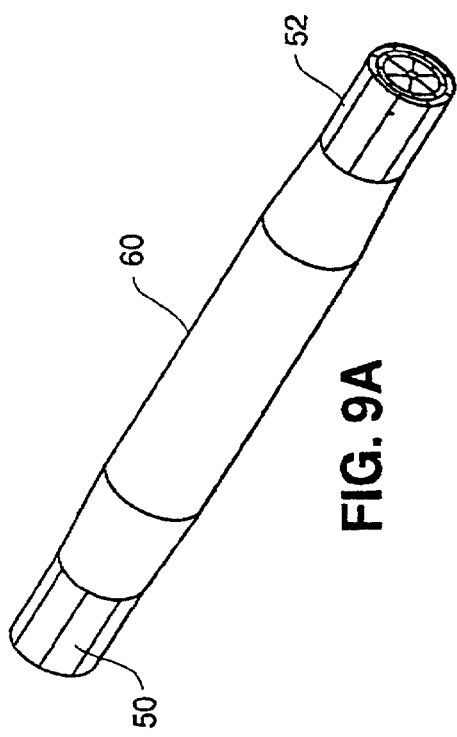
Figure 9B:
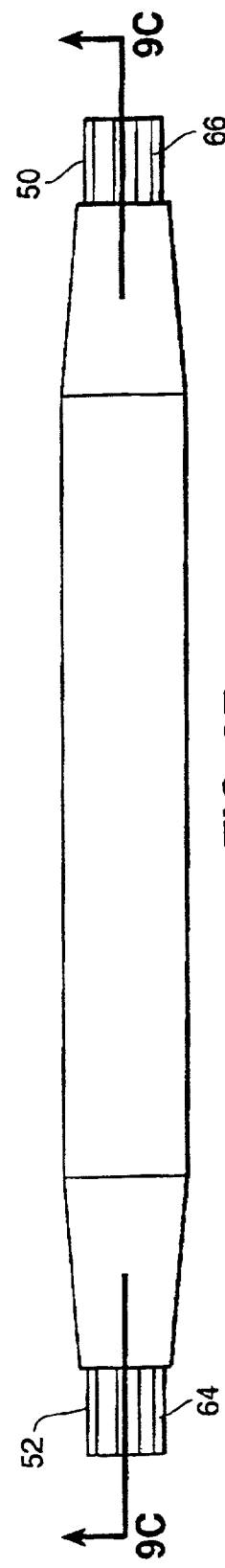
Figure 9C:
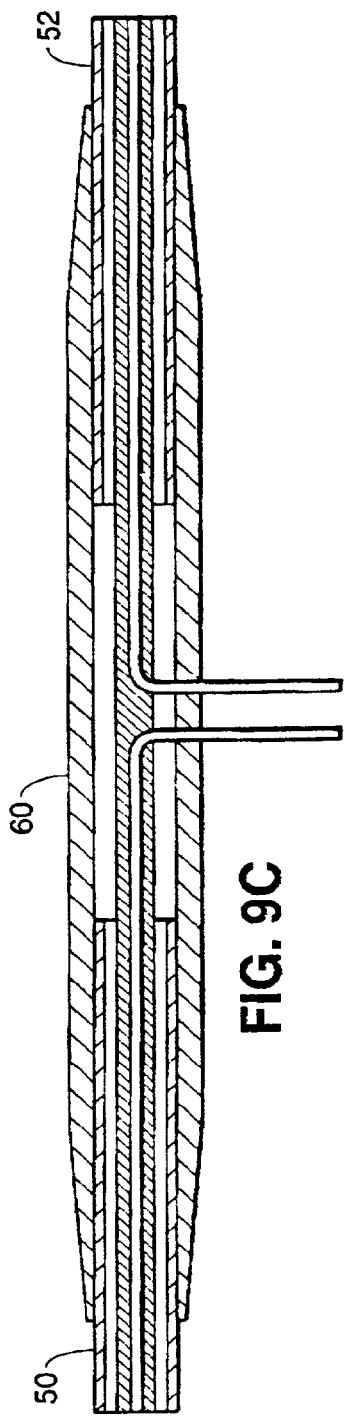

Having thus described the invention in general terms, reference will now be made to the accompanying drawings in which:

FIG. 1 is a fragmentary perspective view of a composite reinforced current carrying conductor constructed in accordance with and embodying the present invention;

FIG. 2 is a fragmentary perspective view, similar to FIG. 1, and showing a slightly modified form of composite reinforced current carrying conductor in accordance with the present invention;

FIG. 3 is a fragmentary perspective view showing still a further modified form of composite reinforced current carrying conductor in accordance with the present invention;

FIG. 4 is a fragmentary perspective view of yet another modified form of composite reinforced current carrying conductor in accordance with the present invention and containing the fiber optic cable;

FIG. 5 is a fragmentary perspective view, similar to FIG. 4, and showing portions of the core spread apart to accept a fiber optic cable;

FIG. 6 is a fragmentary perspective view showing one form of apparatus for producing a composite reinforced current carrying conductor in accordance with the present invention;

FIG. 7 is an exploded perspective view showing one method of splicing to the current carrying conductor of the present invention;

FIG. 8 is a side elevational view showing the technique in the splicing of the cables of FIG. 7; and FIG. 9 is a composite of FIGS. 9a, 9b and 9c showing a finished splice and method providing a fiber optic cable to be spliced at ground level.

DETAILED DESCRIPTION OF PREFERRED EMBODIMENTS

Referring now in more detail and by reference characters to the drawings, which illustrate preferred embodiments of the present invention, $C_1$ illustrates an electrical transmission cable having a reinforced plastic composite load bearing core 10 and a plurality of outer layers of aluminum wire 12 and 14 extending thereabout.

By further reference to FIG. 1, it can be seen that the load bearing core 10 included a solid reinforced plastic composite member. Also, in the embodiment as illustrated in FIG. 1 and the subsequently illustrated and described embodiments, there are three outer aluminum layers 12, 18 and 14 (see FIG. 1), although it should be understood that any number of outer layers could be employed depending upon the desired thickness of the outer current conducting sheath to be formed over the core. It can be observed that in this construction, the cable $C_1$ is similar in appearance to a conventional steel core cable. Consequently, it can be laid in the same fashion or suspended in the same fashion and using the same equipment as that employed for a steel core cable.

Also by further reference to FIG. 1, it can be observed that the aluminum layers 12 and 14 are formed of individual wire bundles 16 and $16^1$ which are helically wound about the central core 10. Thus, the wires can be wound or otherwise applied in any conventional fashion upon the core.

In a preferred embodiment, the strands of reinforcing material are formed of any suitable reinforcing fiber, such as glass, boron, carbon or the like. Moreover, the resin matrix which is used to bind the strands may be formed of any suitable thermoplastic resin or thermosetting resin. Some of the thermosetting resins which may be used include, for example, various phenolics and epoxies and many polyesters which are conventionally known for that purpose. However, the thermoplastic resins are preferred and include, for example, polypropylene, polycarbonates, etc.

Any of a number of commercially available resins can be employed for impregnating the fibers. It is only critical that the matrix should, at some stage of the process, be capable of being liquefied and softened for a period of time sufficient to flow around the fibers or filaments.

It is preferred to use individual ropes or strands of thermoplastic resin along with the individual strands of the fiber reinforcing strands. Thus, the resin strands can be commingled with the fiber strands and they can be applied as a bundle. Otherwise, the resin strands can be applied individually with the fiber strands. Upon heating, the resin will then soften and liquefy and flow around the individual fiber containing strands. When the resin is allowed to harden, an inner core will therefore be formed.

Although not illustrated, the individual first layer of aluminum wire bundle is applied in a first winding stage. Thus, the aluminum wires of the bundle can actually be wound about the central core after formation of same. Thereafter, the central core with the first layer of aluminum wires is passed through a second winding stage in which the second and outer layer 14 of aluminum wires of the second wire bundle are wound about the first outer layer. If additional outer layers are desired, the product is then passed through a third winding stage, etc.

It should also be understood in connection with the present invention that aluminum is only one form of current carrying conductor which could be employed as the outer skin. Thus, copper or other high current conductivity materials could be used for this purpose.

The composite core can be formed in any of a variety of ways. For example, the composite core could be extruded, as such. However, preferably, the reinforced composite when formed as a rod in the embodiment as shown, would preferably be pultruded. Several processes for this pultrusion operation are described in numerous U.S. patents as, for example, U.S. Pat. No. 3,650,864 to William Brandt Goldsworthy, U.S. Pat. No. 3,576,705 to William Brandt Goldsworthy, U.S. Pat. No. 3,769,127 to William Brandt Goldsworthy, and U.S. Pat. No. 3,579,402 to William Brandt Goldsworthy, et al.

The embodiment of FIG. 1 is primarily effective for only short length cables. This is due to the fact that the reinforced plastic core 10 is not capable of significant bending movement. It may be appreciated that the entire cable must be capable of being wound about a drum and transported for a substantial distance where it would then be unwound from the drum and either suspended or laid at a site of use. For this purpose, the central core 10 is preferably formed of a plurality of individually shaped core sections 20, as best shown in the cable $C_2$ of FIG. 2. In this particular case, the individual sections 20, when assembled together, create a cylindrically shaped cable 22.

In the embodiment of the invention as shown in FIG. 2, six individual pie-shaped sections are provided. However, any number of sections could be provided. In connection with the present invention, it has been found that the five individual sections are preferred inasmuch as this is the number of sections which allow for a bending of the cable and a winding of the cable about a spool and which nevertheless do not create an unduly large number of sections forming the cable. In this particular case, the cable is also cylindrical in construction. This is preferred inasmuch as conventional cable using a steel core is now formed with a cylindrically shaped construction. However, any cross sectional shape could be employed.

The cable $C_2$, as shown in the embodiment of FIG. 2, is also wrapped with layers of electrically conductive material as, for example, individual aluminum wires 24 and 26 which form the two outer electrically conductive layers. Again, any desired number of layers could be used. Furthermore, in the embodiment of FIG. 2, the individual strands 24 and 26 are helically wound about the central load bearing core 22.

It has also been found in accordance with the present invention that it is desirable to have an odd number of individual segments as, for example, five, seven or nine individual segments. This allows the cable to be more easily wound about a drum. In addition, it has also been found that by causing a spiraling of the individual segments of the cable over a fairly long distance, that winding of the cable is also more easily obtained. Thus, the cable can be rotated slightly when wound about a drum so as to cause a spiraling of the individual segments. Generally, it is preferred to obtain one spiral per revolution on the drum. This has been found to reduce stresses on the cable and reduce axial build-up of tension-compressive stresses.

It has also been found in accordance with the present invention that it is desirable to have an odd number of individual sections as, for example, five, seven or nine individual sections. This allows the cable to be more easily wound about a drum. In addition, it has also been found that by causing a spiraling of the individual sections of the cable over a fairly long distance, that winding of the cable is also more easily obtained. Thus, the cable can be rotated slightly when wound about a drum so as to cause a spiraling of the individual segments. Generally, it is preferred to obtain one spiral per revolution on the drum. This has been found to reduce stresses on the cable and reduce axial build-up of tension-compressive stresses.

In connection with the following described embodiments, like reference numerals will represent like components. FIG. 3 illustrates an embodiment of a cable $C_3$ forming part of the present invention also having a segmented central core 22 and a pair of electrically conductive outer layers 30 and 32 wrapped about the central core. In this particular case, the layers 30 and 32 are formed of individual wires which are laid longitudinally upon the central core. These wires are comprised of individual bands of electrically conductive material. However, in this particular type of construction, the bands must be secured to the conductor usually by circular retaining bands or the like.

FIG. 4 illustrates an embodiment of a cable $C_4$ similar to the cable $C_3$, except that in this particular case, the individual pie-shaped sections 20 of the core 22 are formed with an arcuately shaped recess 34 formed at their inner most ends. In this particular embodiment, the inner most ends 34, as shown in FIGS. 4 and 5, form a cylindrically shaped central, axially extending bore 36 which are sized to receive a fiber optic cable 38. It can be observed that the individual sections are still tightly arranged to form a cylindrically shaped load bearing core 22, but which nevertheless formed the cylindrically shaped fiber optic cable receiving channel 36 without sacrificing the inherent strength of the overall load bearing core.

This embodiment of a cable $C_4$ is highly effective in that it not only provides for substantial current carrying capacity, but it also allows for the carrying of a fiber optic cable in such manner that the cable is not subjected to environmental degradation or the constant repair required for such cable.

With presently employed fiber optic cable for transmitting fiber optic messages over long distance, a complex scheme is required for splicing ends of the fiber optic cable and, for that matter, even repairing the cable. Typically, the cable must be lowered to a repair station or otherwise a splicing station located approximately at ground level. Moreover, with a conventional steel core electrical transmission cable, there is no effective way to form a central opening extending axially through the core and no effective way to even thread a fiber optic cable through an opening in the core. As a result, and as indicated previously, fiber optic cable is wrapped about the outer surface of the guard wire. The present invention overcomes this problem completely, in that the fiber optic cable can be literally enclosed in the electrical transmission cable as the latter is being formed.

By reference to FIG. 6 of the drawings, it can be observed that each of the individual sections 20 may be pre-formed in an extrusion operation, or otherwise a pultrusion operation, as previously described. These individual sections, when hardened, are then threaded through a die plate or carding plate 40 having individual tubes 42 with essentially the same shape as the individual core sections 20, but sized to receive these core sections 20. By further reference to FIG. 6, it can be seen that the six individual sections 20 are brought together in a cylindrically shaped arrangement and, as they are brought together, envelope a fiber optic core in the interior central bore thereof. Thus, the fiber optic cable is effectively incorporated in the electrical transmission cable as the latter is formed.

The fiber optic cable which is incorporated in the electrical transmission cable $C_4$ is inherently windable about a drum or other winding member. In this particular case, due to the fact that the load bearing core 22 is formed of the individual sections, it similarly is windable about a drum or similar member. Moreover, each can be readily and easily unwound and either suspended or laid in a single operation without the additional steps of applying the fiber optic cable to the electrical transmission cable at an onsite location.

FIGS. 7 and 8 illustrate a preferred embodiment for splicing the ends of the electrical transmission cable in accordance with the present invention. In this particular case, and in order to splice the ends together, the individual cable sections 20 are each spliced with staggered ends, as best shown in FIG. 7. Thus, one of the individual sections $20_a$ on one fiber optic cable 50 has a length which is longer than any other section of that cable 50. That particular core section $20_a$ will match and mate with the shortest cable section $20_b$ on an opposite cable 52 to be spliced. In this manner, a shorter cable section $20_c$ on the cable 50 will match and mate with a cable section $20_d$ in the cable 52. In this way, each staggered length will mate with a corresponding staggered length of the opposite cable. Moreover, the individual cable sections will then fit together much in the manner as pieces of a puzzle fit together.

After the individual staggered sections have been brought together, they can be heated slightly to cause the thermoplastic resin or other resin to liquefy and flow between the staggered ends to thereby bind the staggered ends together. In this way, when the resin is allowed to cool, the staggered ends of one cable form tightly bonded connections to the staggered ends of the opposite cable.

Thereafter, the outer aluminum layers can then be coupled to one another in the same manner as they are presently coupled with steel core cables. Typically, the outer electrically conductive layers of one cable 50 are connected to the outer electrically conductive layers of the cable 52 by use of electrically conductive sleeves which are secured thereto and extend over the joined ends, as best seen in FIG. 9. However, any conventional means of securing the electrically conductive layers of one cable to the opposite cable may be employed.

In accordance with standard cable splicing techniques, and particularly for fiber optic cable, the cable is brought to a ground level for connecting the ends of fiber optic cable sections. The technique for this arrangement is shown in the composite of FIGS. 9a through 9c. The two cable sections 50 and 52 when the splicing is completed are covered with an outer sheath 60, as shown in FIG. 9a. By reference to FIG. 9b, which is a cross-section of FIG. 9a, it can be seen that after the ends of the two cable sections 50 and 52 are spliced, the outer aluminum conductors 64 and 66 respectively on these cable sections are then brought together when the sheath 60 is disposed thereover. Prior to actually installing the sheath, the fiber optic cables are brought to a ground level for purposes of splicing same. It can be seen by reference to FIG. 9c that the cable sections are actually extended down toward a ground level for splicing at a splicing station and thereafter raised and located in the region of the sheath 60 much in the manner as shown in FIG. 9c.

The electrical transmission conductor of the present invention is actually effective to improve the reliability of electrical systems almost universally, in that the conductor of the invention is capable of more fully withstanding adverse weather conditions and high loading conditions as, for example, those imposed by wind, ice build up and the like. As a result, the electrical transmission cables of the invention are greatly advantageous in avoiding power outages caused by line sagging and swinging. Furthermore, efficiency in the power industry is greatly improved, since it reduces the cost of installing new conductors periodically.

It may be appreciated that with the conventional steel core cable, corrosion played a significant role, particularly with the interfacing of a highly conductive metal, such as copper or aluminum, and a lesser conductive metal, such as steel. Moreover, the steel core cable was not capable of withstanding loading to nearly the same degree as the cable of the present invention.

The electrical transmission cables of the invention also are adapted to carry more electrical current then a comparably sized steel core conductor. This is due to the fact that more of the highly conductive metal, such as aluminum, is capable of being carried with a reinforced plastic core then would be carried with a similarly sized steel cable with no weight increase and some weight decrease. As a result, support towers do not need to be rebuilt to accommodate heavier equivalent capacity conductors.

It has been found that the cables of the present invention will actually carry five percent more electrical current compared to a steel reinforced aluminum conductor. In addition, there is a reduced mechanical elongation or line sag at high operating temperatures. Further, it has actually been established that the cables of the invention are two hundred fifty percent stronger then the steel reinforced aluminum conductor of essentially the same size and, moreover, is seventy-five percent lighter than steel reinforced aluminum conductors. As a result, the overall economic performance of the conductors of the invention greatly outweighs the usefulness of the steel core electrical cable. It should also be recognized that the use of the reinforced composite core cable actually reduces not only cost, but public health concerns inasmuch as the cables of the invention reduce the need for new transmission lines. Furthermore, the cables of the invention significantly reduce potential for line clearance violations.

The conductor of the invention is actually adapted to replace aging and overloaded power lines with essentially the same equipment which was previously used and without the need for any additional tooling or the like. The cables of the invention, as indicated above, are more capable of withstanding adverse weather and high loading conditions. As a result, power outages will be far less frequent and installation costs of new cable will be reduced.

Thus, there has been illustrated and described a unique and novel method and apparatus for providing electrical transmission cables with reinforced plastic composite cores, and which eliminates many of the problems previously encountered in formation and locating of electrical transmission cables. The present invention thereby fulfills all of the objects and advantages which have been sought therefor. Many changes, modifications, variations and other uses and applications will become apparent to those skilled in the art after considering the specification and the accompanying drawings. Therefore, any and all such changes, modifications, variations and other uses and applications, which do not depart from the spirit and scope of the invention, are deemed to be covered the invention.

Having thus described the invention, what we desire to claim and secure by Letters Patent is:

1. An electrical current carrying conductor for long distance transmission of electrical current, said current carrying conductor comprising:
   a) a relatively solid high tensile strength central load carrying core formed from a plurality of generally arranged component core members which abut together and which are each generally polygonally shaped in cross-section and when abutted together define a generally solid cylindrically shaped core each core member formed from a fiber reinforced composite material, said core being of sufficient cross-sectional size to support the tensile loading on the conductor when the conductor is suspended between support towers, wherein said conductor is capable of being wound around a drum; and
   b) an outer highly conductive electrical current carrying sheath completely surrounding said load carrying core for carrying electrical current over said distance, wherein the plurality of component core members allow for the winding of the conductor around the drum.

2. The electrical current carrying conductor of claim 1 further characterized in that said outer sheath is comprised of aluminum which is not alloyed to provide load carrying capacity.

3. The electrical current carrying conductor of claim 1 further characterized in that said reinforced composite material is comprised of a plurality of aligned reinforcing fibers embedded in a thermoplastic composite matrix.

4. The electrical current carrying conductor of claim 1 further characterized in that said core members are capable of being separated from one another for purposes of splicing.

5. The electrical current carrying conductor of claim 1 further characterized in that said, core members are generally triangular in cross-section.

6. The electrical current carrying conductor for long distance transmission of electrical current of claim 1 further characterized in that said electrical current carrying sheath is formed of a non-alloyed aluminum.

7. A method of producing a long distance transmission current carrying conductor, said method comprising:
   a) bringing a plurality of individual reinforced composite core sections together in abutting relationship to form a generally cylindrically shaped solid core, each core section having a generally polygonally shaped cross-section, wherein said core is of sufficient cross-sectional size to support the tensile loading on the conductor when the conductor is suspended between support towers;
   b) locating on an outer cylindrically shaped surface of said core an outer highly conductive electrical current carrying conductor and winding the conductor around a drum.

8. The method for producing a long distance transmission current carrying conductor of claim 7 further characterized in that said locating the current carrying conductor comprises winding individual wires of a highly conductive current carrying conductor about the central core.

9. The method for producing a long distance transmission current carrying conductor of claim 8 further characterized in that said method comprises helically winding said wires about said core.

10. The method for producing a long distance transmission current carrying conductor of claim 7 further characterized in that said outer surface is comprised of aluminum wires.

11. The method for producing a long distance transmission current carrying cable of claim 7 further characterized in that said reinforced plastic composite sections are each comprised of a plurality of aligned reinforcing fibers embedded in a thermoplastic composite matrix.

12. The method for producing a long distance transmission current carrying conductor of claim 7 further characterized in that said method comprises the bringing of the composite sections together about a fiber optic cable so that the current carrying conductor also includes a fiber optic cable extending through said core.

13. An electrical current carrying conductor for long distance transmission of electrical current, said current carrying conductor comprising:
    a) a relatively solid high strength central load carrying core formed from a plurality of generally arranged component core members which abut together and which are each generally polygonally shaped in cross-section such that when abutted form a generally solid cylindrically shaped core, each member being formed of a fiber reinforced composite material said core being of sufficient cross-sectional size to support the tensile loading on the conductor when the conductor is suspended between support towers, and wherein the conductor is capable of being wound around a drum;
    b) an outer highly conductive electrical current carrying sheath completely surrounding said load carrying core for carrying electrical current over said distance;
    c) a central bore extending axially through said core; and
    d) a fiber optic cable extending through the central bore allowing the conductor to carry electrical current and fiber optic cable signals with the same conductor, wherein the abutting component core members and the fiber optic cable define a cylindrical solid core.

14. The electrical current carrying conductor of claim 13 further characterized in that said outer sheath is comprised of aluminum which is not alloyed to provide load carrying capacity.

15. The electrical current carrying conductor of claim 14 further characterized in that said reinforced composite material is comprised of a plurality of aligned reinforcing fibers embedded in a thermoplastic composite matrix.

16. The electrical current carrying conductor of claim 13 further characterized in that said core members are capable of being separated from one another for purposes of splicing.

17. The electrical current carrying conductor for long distance transmission of electrical current of claim 13 further characterized in that said electrical current carrying sheath is formed of a non-alloyed aluminum.

18. The electrical current carrying conductor of claim 13, wherein the plurality of component core members allow for the winding of the conductor around the drum.

* * * * *

UNITED STATES PATENT AND TRADEMARK OFFICE
CERTIFICATE OF CORRECTION

| | |
|---|---|
| PATENT NO. | : 7,015,395 B2 |
| APPLICATION NO. | : 10/037814 |
| DATED | : March 21, 2006 |
| INVENTOR(S) | : Goldsworthy et al. |

It is certified that error appears in the above-identified patent and that said Letters Patent is hereby corrected as shown below:

In the Specification

| | |
|---|---|
| Column 2, line 2 | Delete "is", Insert --are-- |
| Column 2, line 13 | Delete "having", Insert --has-- |
| Column 3, line 15 | After "pointed", Insert --out-- |
| Column 5, line 29 | Delete "included", Insert --includes-- |
| Column 5, line 43 | Delete "$16^1$", Insert --18-- |
| Column 6, line 61, through Column 7, line 6 | Delete "It has also been found in accordance with the present invention that it is desirable to have an odd number of individual segments as, for example, five seven, or nine individual segments. This allows the cable to be more easily wound about a drum. In addition, it has also been found that by causing a spiraling of the individual segments of the cable over a fairly long distance, that winding of the cable is also more easily obtained. Thus, the cable can be rotated slightly when wound about a drum so as to cause a spiraling of the individual segments. Generally, it is preferred to obtain one spiral per revolution on the drum. This has been found to reduce stresses on the cable and reduce axial build-up of tension-compressive stresses." |
| Column 7, line 41 | Delete "formed", Insert --form-- |
| Column 8, line 20 | Delete "onsite", Insert --on-site-- |

UNITED STATES PATENT AND TRADEMARK OFFICE
CERTIFICATE OF CORRECTION

PATENT NO. : 7,015,395 B2
APPLICATION NO. : 10/037814
DATED : March 21, 2006
INVENTOR(S) : Goldsworthy et al.

It is certified that error appears in the above-identified patent and that said Letters Patent is hereby corrected as shown below:

In the Specification (cont'd)

Column 9, line 28      Delete "then",
Insert --than--

In the Claims

Column 10, line 42, Claim 5      Delete "said,",
Insert --said--

Column 10, line 59, Claim 7      Delete "conductor and winding",
Insert --conductor; and
     c) winding--

Column 11, line 29, Claim 13      Delete "material said",
Insert --material, said--

Column 12, line 16, Claim 15      Delete "claim 14",
Insert --claim 13--

Column 12, line 24, Claim 17      Delete "claim 13",
Insert --claim 15--

Signed and Sealed this

Fourteenth Day of August, 2007

JON W. DUDAS
*Director of the United States Patent and Trademark Office*

(12) EX PARTE REEXAMINATION CERTIFICATE (9579th)
United States Patent
Goldsworthy et al.

(10) Number: US 7,015,395 C1
(45) Certificate Issued: Mar. 27, 2013

(54) COMPOSITE REINFORCED ELECTRICAL TRANSMISSION CONDUCTOR

(75) Inventors: William Brandt Goldsworthy, Torrance, CA (US); George Korzeniowski, Torrance, CA (US)

(73) Assignee: Gift Technologies, LP, Redondo Beach, CA (US)

Reexamination Request:
No. 90/011,652, Apr. 20, 2011

Reexamination Certificate for:
Patent No.: 7,015,395
Issued: Mar. 21, 2006
Appl. No.: 10/037,814
Filed: Dec. 28, 2001

Certificate of Correction issued Aug. 14, 2007.

Related U.S. Application Data

(63) Continuation of application No. 09/500,285, filed on Feb. 8, 2000, now abandoned.

(51) Int. Cl.
*G02B 6/255* (2006.01)
*H01B 7/18* (2006.01)
*H01R 4/62* (2006.01)
*H02G 1/02* (2006.01)
*H02G 7/04* (2006.01)
*H02G 15/18* (2006.01)

(52) U.S. Cl.
USPC .................................. 174/102 R; 174/113 C

(58) Field of Classification Search .......................... None
See application file for complete search history.

(56) References Cited

To view the complete listing of prior art documents cited during the proceeding for Reexamination Control Number 90/011,652, please refer to the USPTO's public Patent Application Information Retrieval (PAIR) system under the Display References tab.

*Primary Examiner* — John M Hotaling, II

(57) ABSTRACT

A composite reinforced electrical transmission conductor primarily designed for transmission of electrical signals. The conductor is comprised of a reinforced plastic composite inner core along with an outer highly electrically conductive sheath therearound. In this way, the inner core provides the necessary strength and the outer sheath provides for transmission of the electrical signals. In a preferred embodiment, the reinforced composite core is comprised of individual sections which cooperate together to provide the necessary loading capabilities. Further, a fiber optic cable may also be carried by the composite reinforced core. A splicing arrangement for securing ends of the cable together is also provided.

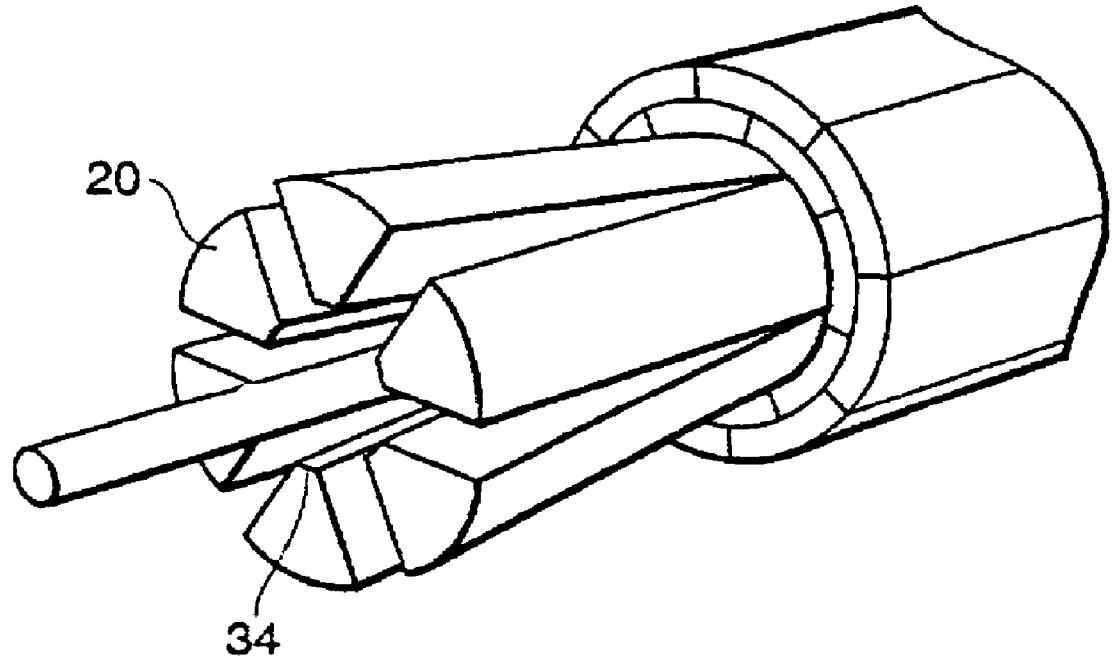

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-18 are cancelled.

\* \* \* \* \*